United States Patent
Littman et al.

(10) Patent No.: US 11,311,871 B2
(45) Date of Patent: Apr. 26, 2022

(54) DETECTION AND TARGETED REMEDIATION OF MECHANICAL DEVICE ALIGNMENT ERRORS

(71) Applicant: Beckman Coulter, Inc., Brea, CA (US)

(72) Inventors: Brian J. Littman, Prior Lake, MN (US); Pradeep Pasumarthy, Eden Prairie, MN (US)

(73) Assignee: Beckman Coulter, Inc., Brea, CA (US)

( * ) Notice: Subject to any disclaimer, the term of this patent is extended or adjusted under 35 U.S.C. 154(b) by 208 days.

(21) Appl. No.: 16/797,145

(22) Filed: Feb. 21, 2020

(65) Prior Publication Data

US 2021/0346882 A1 Nov. 11, 2021

Related U.S. Application Data

(60) Provisional application No. 62/809,223, filed on Feb. 22, 2019.

(51) Int. Cl.
| | |
|---|---|
| *G01L 5/00* | (2006.01) |
| *B01L 3/02* | (2006.01) |
| *G01N 35/10* | (2006.01) |
| *G01P 15/00* | (2006.01) |
| *G01B 5/25* | (2006.01) |
| *B25J 9/16* | (2006.01) |
| *G01B 21/04* | (2006.01) |

(52) U.S. Cl.
CPC .......... *B01L 3/0217* (2013.01); *B25J 9/1692* (2013.01); *G01B 5/25* (2013.01); *G01B 21/042* (2013.01); *G01L 5/0066* (2013.01); *G01N 35/1065* (2013.01); *G01P 15/003* (2013.01); *B01L 2200/025* (2013.01)

(58) Field of Classification Search
None
See application file for complete search history.

(56) References Cited

U.S. PATENT DOCUMENTS

| | | | |
|---|---|---|---|
| 6,925,367 B2 | 8/2005 | Fontius | |
| 7,047,142 B2 | 5/2006 | Wada et al. | |
| 8,065,113 B2 | 11/2011 | Okuno et al. | |
| 8,104,189 B2 * | 1/2012 | Tait | G01B 5/008 33/503 |
| 8,595,553 B2 | 11/2013 | Goertler et al. | |
| 9,015,059 B2 | 4/2015 | Sims et al. | |

(Continued)

*Primary Examiner* — Christopher W Fulton
(74) *Attorney, Agent, or Firm* — Frost Brown Todd LLC

(57) ABSTRACT

Misalignment of intersecting devices on a diagnostic instrument may be detected and remediated using a system comprising components such as an accelerometer, a plurality of strain gauges and a device comprising a processor and a memory (e.g., a computer). In such a system, the accelerometer may be adapted to detect movement of the diagnostic instrument. The device comprising the processor and the memory may be configured to, for each of the structural elements of the diagnostic instrument, determine whether an alignment change has taken place in that structural element based on analyzing measurements made by the plurality of strain gauges. The device comprising the processor and the memory may also be configured to, for each structural element where an alignment change is determined to have taken place, trigger a remediation for each device from a set of devices impacted by the alignment change of that structural element.

12 Claims, 6 Drawing Sheets

(56) References Cited

U.S. PATENT DOCUMENTS

| | | |
|---|---|---|
| 9,280,642 B2 | 3/2016 | Suga et al. |
| 9,541,905 B2 | 1/2017 | Nixon et al. |
| 9,959,181 B2 | 5/2018 | Hittel et al. |
| 2009/0099803 A1* | 4/2009 | Fuge .................. G01B 7/012 |
| | | 702/95 |
| 2009/0248345 A1* | 10/2009 | Jonas ................ G01B 21/042 |
| | | 33/502 |
| 2017/0286611 A1 | 10/2017 | Goertler et al. |
| 2018/0046781 A1 | 2/2018 | Miyauchi et al. |

* cited by examiner

DETECTION AND TARGETED REMEDIATION OF MECHANICAL DEVICE ALIGNMENT ERRORS

This application claims priority to U.S. Provisional Application No. 62/809,223, entitled "Detection and Targeted Remediation of Mechanical Device Alignment Errors," filed Feb. 22, 2019, the disclosure of which is incorporated by reference herein.

FIELD

The disclosed technology pertains detecting and performing targeted remediation of alignment errors in mechanical devices.

BACKGROUND

Diagnostic instruments may include a variety of devices that would need to travel intersecting paths in the course of the instrument's operation. These could include probes for dispensing and/or aspirating fluids from vessels, grippers for moving vessels from one location to another in the instrument, as well as other devices. It has been found that, over time, the alignment of these devices can degrade, and that this can negatively impact operation of the instrument. For example, alignment of a probe or gripper with a vessel station could cause those components to improperly perform their operations, such as by splashing contents of vessels, or even dropping a vessel that should be transported from one location in an instrument to another. One approach to addressing this issue is for a field service engineer to perform regular alignment checks on an instrument's various systems. However, this can result in significant wasted labor (e.g., performing an alignment check when no alignment change has taken place/performing alignment checks for all systems in an instrument when an alignment change has taken place in only some systems), and may not identify all alignment issues (e.g., if an alignment issue arises between alignment checks).

SUMMARY

Embodiments of the present disclosure may be used to detect and/or perform targeted remediation of mechanical device alignment errors.

One embodiment may be to provide an intersecting device misalignment and remediation system for a diagnostic instrument. Such a system may comprise components such as an accelerometer, a plurality of strain gauges and a device comprising a processor and a memory. In such a system, the accelerometer may be adapted to detect movement of the diagnostic instrument. The device comprising the processor and the memory may be configured to, for each of the structural elements of the diagnostic instrument, determine whether an alignment change has taken place in that structural element based on analyzing measurements made by the plurality of strain gauges. The device comprising the processor and the memory may also be configured to, for each structural element where an alignment change is determined to have taken place, trigger a remediation for each device from a set of devices impacted by the alignment change of that structural element. Other embodiments are also disclosed.

BRIEF DESCRIPTION OF THE DRAWINGS

The drawings and detailed description that follow are intended to be merely illustrative and are not intended to limit the scope of the invention as contemplated by the inventors.

DETAILED DESCRIPTION

Figure 1:
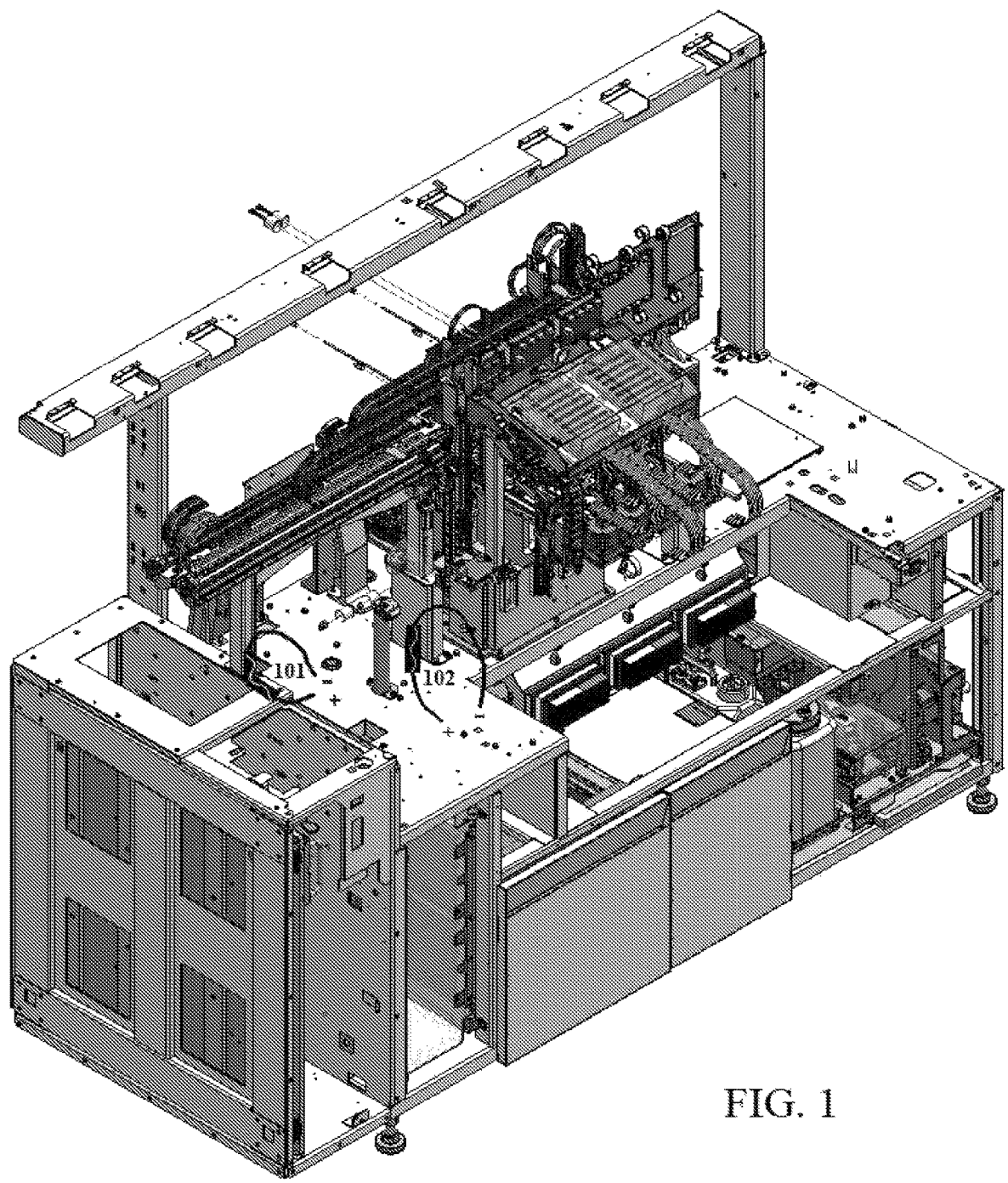
FIG. 1 shows an exemplary instrument with strain gauges attached thereto.

Detecting and providing targeted remediation of mechanical device alignment errors has heretofore been complicated by the lack of an understanding of how such errors would arise. This can lead to significant wasted effort and potential for missing errors when relying on periodic alignment checks by human engineers. Aspects of the disclosed technology may be deployed to address these issues, such as by applying a discovery that alignment errors may be traced back to issues introduced during movement of an instrument (e.g., from one location to another in a laboratory, where the surface of the target location may be uneven or otherwise differ from the surface where the instrument was previously situated).

One embodiment may provide an intersecting device misalignment and remediation system for a diagnostic instrument. Such a system may comprise components such as an accelerometer, a plurality of strain gauges and a device comprising a processor and a memory (e.g., a computer). In such a system, the accelerometer may be adapted to detect movement of the diagnostic instrument. The device comprising the processor and the memory may be configured to, for each of the structural elements of the diagnostic instrument, determine whether an alignment change has taken place in that structural element based on analyzing measurements made by the plurality of strain gauges. The device comprising the processor and the memory may also be configured to, for each structural element where an alignment change is determined to have taken place, trigger a remediation for each device from a set of devices impacted by the alignment change of that structural element. Other embodiments are also disclosed.

In some embodiments such as described in the preceding paragraph, the diagnostic instrument may comprise a base plate, and the plurality of strain gauges may comprise at least one set of strain gauges selected from the set of strain gauge sets consisting of: (i) a set of four strain gauges connected to the baseplate; and (ii) a set of two strain gauges, each of which is connected to the baseplate and to a gantry in an angled shape (e.g., an "L" shape).

In some embodiments such as described in the preceding paragraph, the base plate may have a rectangular shape. In such embodiments, the plurality of strain gauges may comprise the set of four strain gauges connected to the baseplate, and each of those strain gauges may be connected to the baseplate at a predetermined stress point from a set of predetermined stress points on the baseplate.

In some embodiments such as described in the preceding paragraph, the set of predetermined stress points on the baseplate may comprise a point equidistant from a center of the baseplate and a first corner of the baseplate, a point equidistant from the center of the baseplate and a second corner of the baseplate, a point equidistant from the center of the baseplate and a third corner of the baseplate, and a point equidistant from the center of the baseplate and a fourth corner of the baseplate.

In some embodiments such as described in any of the preceding four paragraphs, the structural elements of the diagnostic instrument may comprise a pick and place system, and the device comprising the processor and the memory may be configured to, when an alignment change is determined to have taken place in the pick and place system, trigger remediation for a vessel holding assembly coupled to the pick and place system.

In some embodiments such as described in any of the preceding five paragraphs, the structural elements of the diagnostic instrument may comprise a pipetting system, and the device comprising the processor and the memory may be configured to, when an alignment change is determined to have taken place in the pipetting system, trigger a remediation for a probe coupled to the pipetting system.

Corresponding methods and computer readable media may also be implemented as embodiments of the aspects of the disclosed technology.

In some embodiments, there may be provided a diagnostic instrument outfitted with one or more sensors to gather information for the detection of alignment errors. In some embodiments, such a diagnostic instrument may be outfitted with a plurality of sensors, such as an accelerometer and a plurality of strain gauges. In such an embodiment, the accelerometer and strain gauges may be attached to various locations on the instrument. For example, in some embodiments, strain gauges may be attached to an instrument's frame at locations where elements of the frame come together to form angles. An example of this type of placement is shown by the strain gauges 101 102 in FIG. 1, in which those strain gauges are attached to the frame where the baseplate intersects the gantry in an angled shape (preferably a right-angled L-shape). Alternatively, or additionally, in some embodiments, strain gauges may be attached to the instrument's baseplate at various predetermined stress points (i.e., points identified as likely to be under stress if the base plate had suffered some kind of deformation). These stress points could be, for example, points midway between the plate's center and its corners. These strain gauges, and accelerometer(s), along with other sensors that might be present, may be communicatively connected to a computer that may be configured to detect alignment errors based on information from the sensors, and may also be configured to control other aspects of the instrument's operation.

Figure 2:
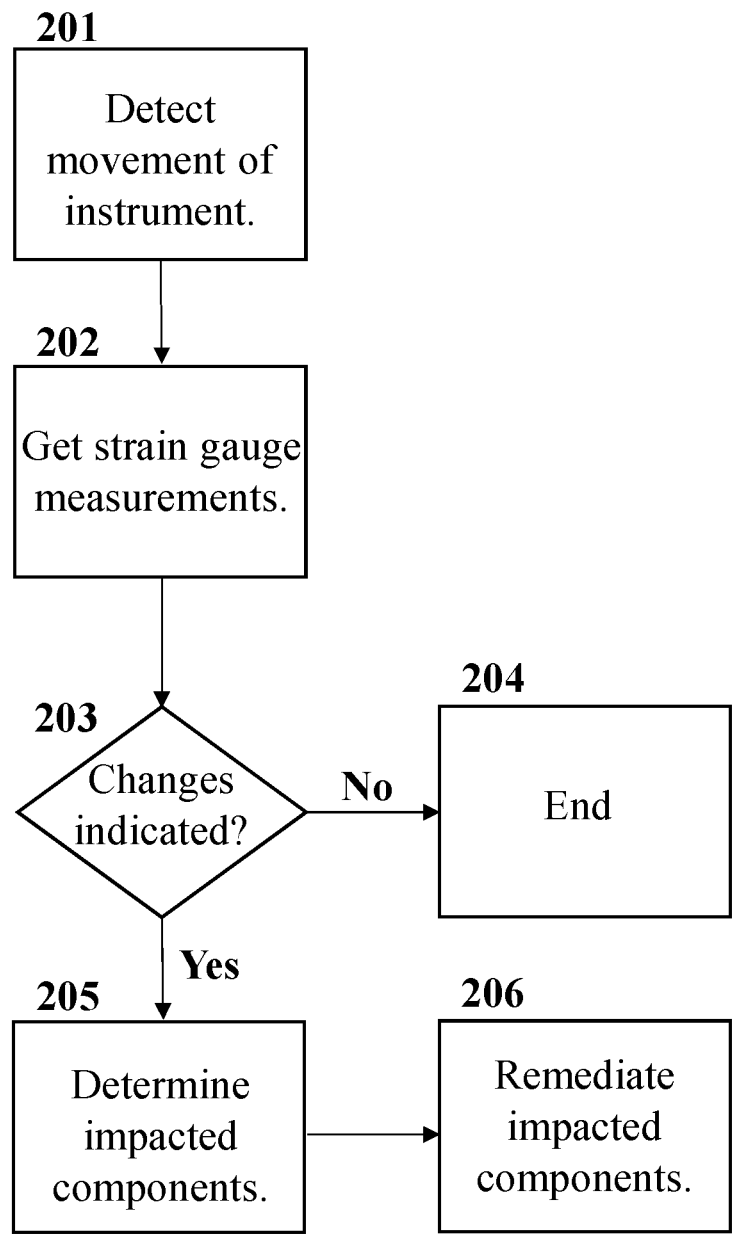
FIG. 2 shows an exemplary process that may be used for detection and remediation of alignment errors.

Turning now to FIG. 2, that figure shows an exemplary process that may be used for detection and remediation of alignment errors in a diagnostic instrument such as discussed above. As shown in FIG. 2, in some embodiments detection and remediation of alignment errors may begin with detection 201 of movement of an instrument. In some embodiments, this may be done by comparing readings from the accelerometer with a predefined threshold to screen out spurious/de minimis readings. In such an embodiment, if the readings from the accelerometer exceeded the filtering threshold, this could be treated as indicating that the instrument had been moved and that further steps to detect alignment errors should be performed.

In a process following FIG. 2, when movement of the instrument is detected 201, measurements may be taken 202 from the plurality of strain gauges. These measurements could then be analyzed (e.g., by comparing them to a threshold in a manner similar to that described for the detection of movement) to determine 203 if they indicated that the movement had resulted in any alignment changes. If this analysis indicated that there were no alignment changes, then the process could end 204. Otherwise, if the strain gauge measurements indicated there had been an alignment change, a determination 205 could be made of which of the instrument's components had been impacted. This could be done, for example, by using the strain gauge measurements to identify specific portions of the instrument that had experienced structural changes, using a model of the instrument that had previously been generated using finite element analysis to identify components located downstream of those portions, and identifying each of the downstream components as having been impacted.

Once one or more impacted components had been determined 205 an embodiment performing a process such as shown in FIG. 2 could proceed with remediation 206 of whatever components had been impacted. This, like the other steps illustrated in FIG. 2, may be performed in a variety of ways. For example, in some cases, remediation 206 may include providing a notification, either to a field service engineer directly or to an operator of the instrument via an alert on an interface, that the impacted component(s) had moved out of alignment, thereby allowing the component(s) to be serviced without the field service engineer having to go through each of the instrument's systems to try and identify the alignment error himself or herself. As an alternative, in some cases the remediation may include performing an automated fix. An example of this type of automated remediation that may be performed for a gripper in some embodiments is provided below in the context of FIGS. 4-9.

Figure 5:
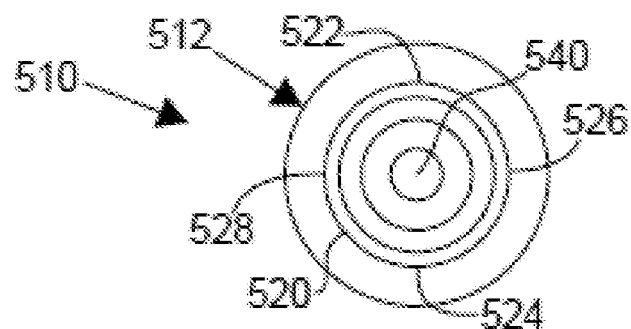
FIG. 5 illustrates a top plan view of a target that could be used for alignment remediation in some embodiments.
Figure 4:
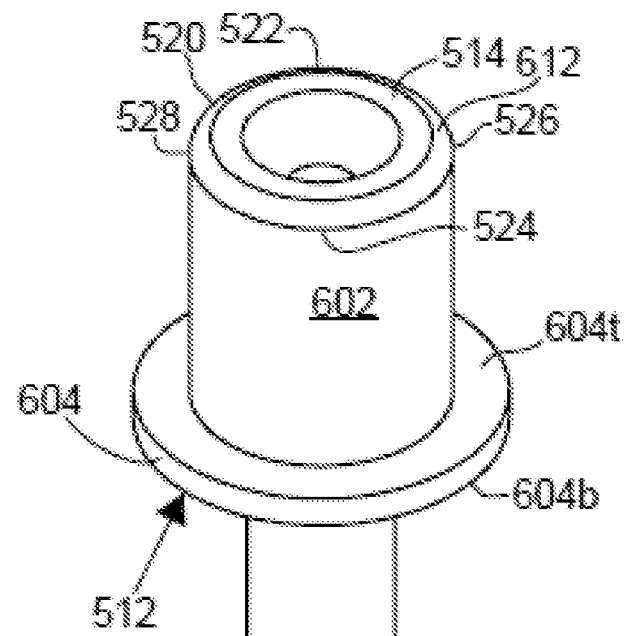
FIG. 4 illustrates a perspective view of a target that could be used for alignment remediation in some embodiments.

Turning now to FIGS. 4-5, those figures depict a target that may be used in some embodiments for automated remediation of gripper misalignments. In an embodiment following FIGS. 4-5, the target 510 includes a pin body 512 that extends between a top 514 and a bottom 516. The gripped portion 602 (e.g., a pin, a head) is positioned adjacent the top 514 of the pin body 512. A tail 606 of the pin body 512 is positioned adjacent the bottom 516 of the pin body 512. A flange 604 is positioned between the gripped portion 602 and the tail 606 of the pin. The flange 604 includes a first side 604t and a second side 604b. As depicted, the first side 604t is a top side 604t and the second side 604b is a bottom side 604b. A groove 608 may be included adjacent the bottom 516 of the pin body 512. A chamfer 614 adjacent the second end 516 of the pin body may ease installation of the target 510 into a location in the instrument where a misalignment is identified. A chamfer 612 may be included between the gripped portion 602 and the first end 514 of the pin body. The gripped portion 602 may include an edge or edges 520 around a perimeter of the gripped portion adjacent the first end 510 of the pin body 512. In the depicted target, the gripped portion 602 is a cylindrical shape and therefore has a circular edge 520 that extends around the perimeter of the gripped portion 602 adjacent the first end 514 of the pin body 512. The edge 520 may be divided into edge portions for use when a gripper is aligned with the target 510. In particular, as illustrated at FIG. 5, an edge portion 522 is positioned at the top of the edge 520. An edge portion 524 is positioned opposite from the edge portion 522 and is illustrated at the bottom of the edge 520 at FIG. 5. An edge portion 526 is illustrated at FIG. 5 on a right side of the edge 520, and an edge portion 528 is illustrated at a left side of the edge 520 at FIG. 5. A center 540 is illustrated at FIG. 5 at the center of the edge 520 and centered between the edge portions 522 and 524 and also centered between the edge portions 526 and 528.

Figure 6:
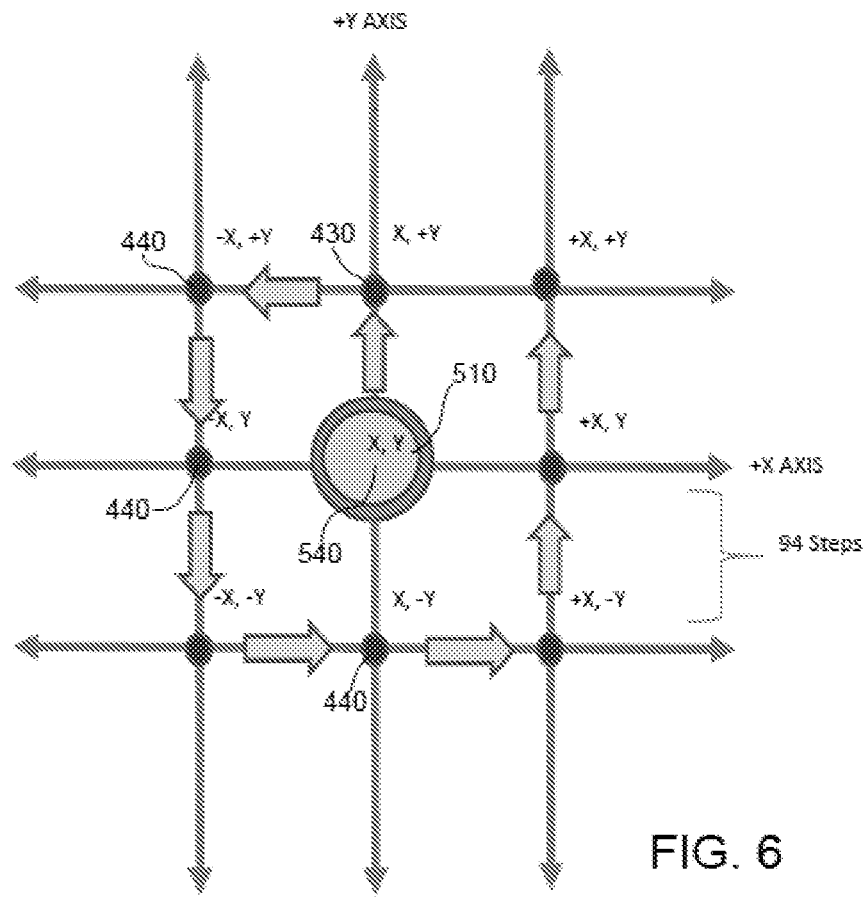
FIG. 6 is a schematic plan view of movements that could be used for alignment remediation in some embodiments.
Figure 7:
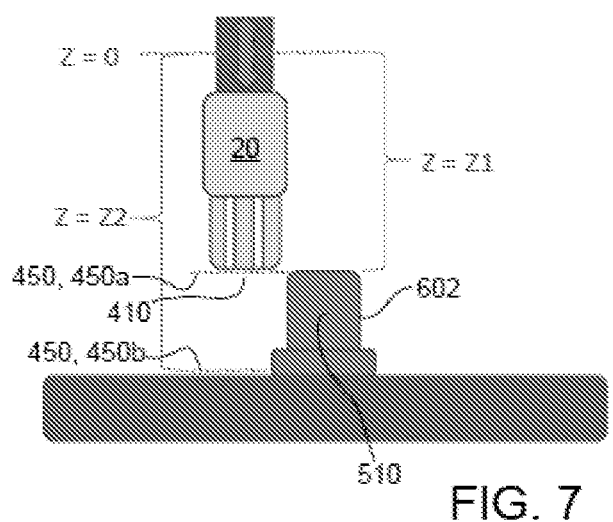
FIG. 7 is a schematic elevation view of movements associated with finding a presence of a target by detecting stalling of an actuator.
Figure 8:
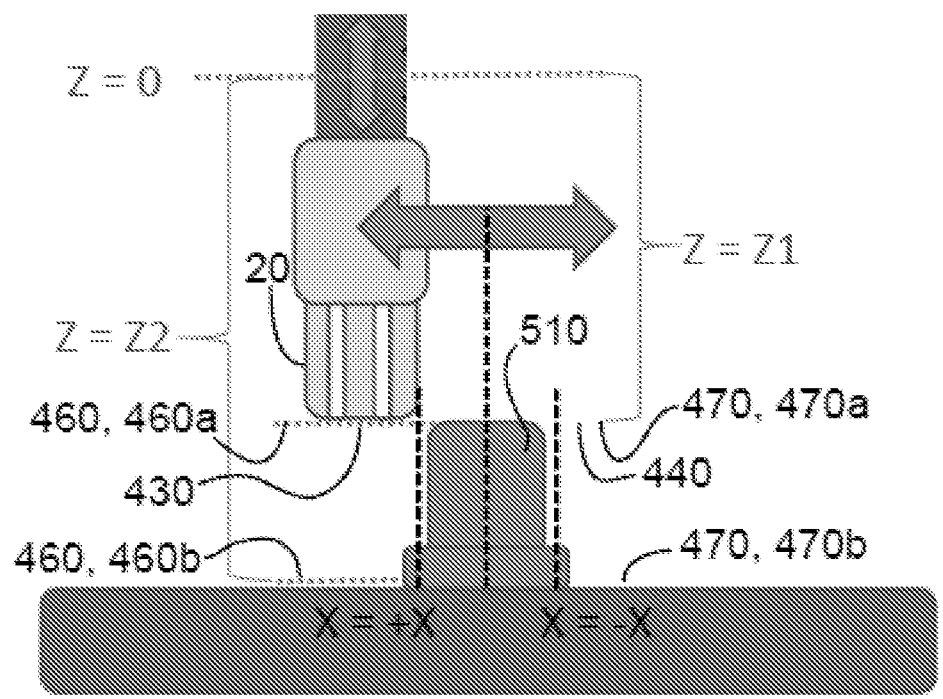
FIG. 8 is a schematic elevation view of movements that may be used to determine edges of a target.

In some embodiments, a target such as shown in FIGS. 4-5, may be used to remedy gripper misalignments by placing the target at an area where the gripper would normally grip a vessel and then providing the gripper with commands that would normally cause it to engage with a vessel at that position if there was no misalignment. A test can then be performed to determine the actual position of the target relative to the gripper by testing for slippage along a vertical axis. This test can include moving an actuator of the griper in the Z axis direction such that the gripper 20 as shown in FIG. 7 is run against the target 510 or run against areas adjacent to the target 510. This Z axis test may be repeated around the assumed position of the target in a grid hunting fashion as shown in FIG. 6. Preferably, the actuator for the gripper will include a stepper motor and an encoder, and by comparing the difference reported by the stepper motor and the encoder, it may be determined if slippage has occurred in the stepper motor. The stepper motor may be operated at a reduced power level to make slippage occur at a lower force magnitude than would occur in normal operation of the actuator. If the slippage is not detected in a certain range, it is determined that the gripper 20 has missed the target 510 and grid hunting may resume, as illustrated at FIG. 6. For example, if the gripper 20 has missed the target 510 at the X, Y position, a new attempt may be made at the X, +Y position. Likewise, if the target 510 is missed again, a third try may be made at the −X, +Y position. In some embodiments, the gripper 20 will be moved until all nine positions have been checked. In other embodiments, more than nine positions may be checked or fewer than nine positions may be checked. In other embodiments, the X Y coordinates may not necessarily be rectilinear as illustrated at FIG. 6. FIG. 7 illustrates the gripper 20 being positioned at a first position near the top of the target 510. Upon testing for Z axis stalling, a first stalled position 450 will be detected. If the first stalled position is at 450a then the gripper assembly (which may also be referred to as a vessel holding assembly) 20 has met the top of the target 510. If the first stalled position 450 is at 450b, then the target 510 has been missed. A first predetermined position 410 is thereby indicated at position X, Y of FIG. 6 at an elevation indicated at FIG. 7. Upon the gripper 20 missing the target 510 at position X, Y, the gripper 20 is moved to position 430, as illustrated at FIG. 8. If position 430 also results in the gripper 20 missing the target 510, the gripper 20 is moved to subsequent predetermined positions 440 until the target 510 is found. As illustrated at FIG. 8, a second stalled position 460 may be at 460a, in which the gripper 20 has detected a top of the target 510. However, if the second stalled position 460 is 460b, then the target 510 has again been missed. Upon missing the target at the third predetermined position 430, the gripper 20 is moved toward the subsequent predetermined positions 440 and the stalling test is repeated. As further illustrated at FIG. 8, the gripper may stall at the subsequent stalled position 470a which indicates the top of the target 510 has been detected. However, if the subsequent stalled positions 470 are at 470b, the target 510 has again been missed and additional subsequent predetermined positions, as illustrated at FIG. 6 will be tested until the target 510 is found.

Figure 9:
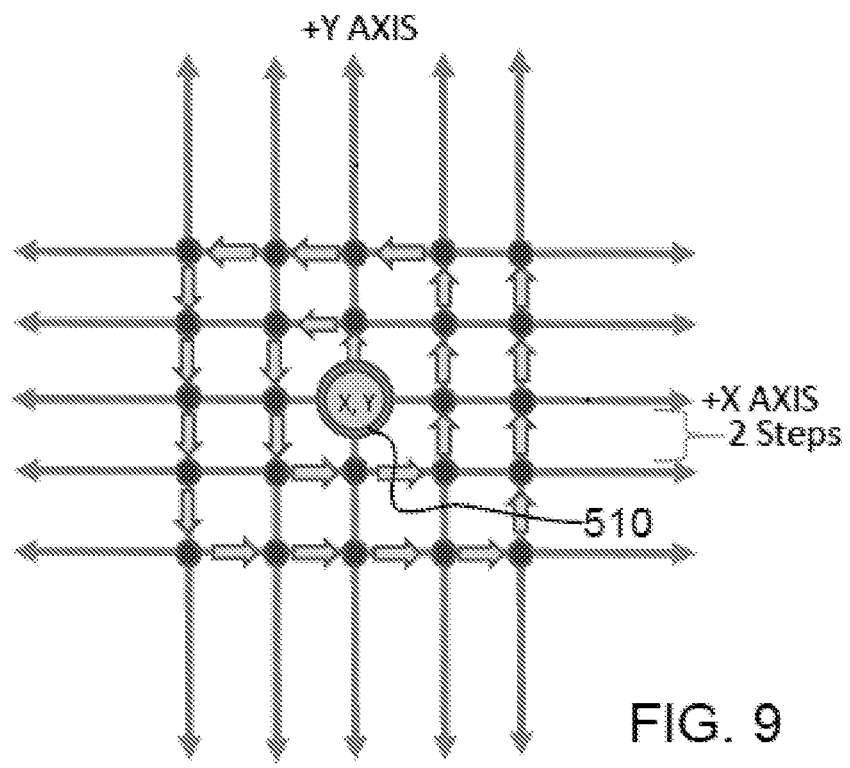
FIG. 9 is a schematic plan view of movements associated with testing a grip pattern.

Upon the target 510 being found, Z axis slippage is again used to discover the boundaries of the target 510. In particular, the edges 522, 524, 526, 528 are located. This may also be done in a grid hunting fashion, as illustrated at FIG. 9. The increments used in the edge detecting grid hunting may be substantially smaller than the increments used in the initial pin detection grid hunting. Once the edges 522, 524, 526, 528 are discovered for the +X and −X limits, then the center 540 should be calculated along the X direction. This may be repeated for the +Y and −Y limits or +α and −α limits. After calculating centers for both directions, the gripper 20 should be moved to the center position 540 and tested to see if it can reach a proper Z height while holding the target. If so, then the actual position of the target will be treated as having been successfully detected, and the difference between that actual position and the position the target would have been expected to occupy if there had been no misalignment could be used to modify the movement of the gripper going forward to compensate for the misalignment.

Of course, it should be understood that the discussion of automatic remediation described above in the context of FIGS. 4-9 is intended to be illustrative only, and that other approaches to automatic remediation may also be used in some embodiments. For example, in some embodiments, strain gauge measurements may be applied to a model of the instrument to determine the likely impact of a change in shape, so that compensatory measurements could be taken. For instance, if measurements indicated that a gripper had shifted 2 millimeters relative to the frame of the instrument, the impact may be remediated 206 by configuring software controlling operation of the gripper to correct for this movement when positioning the gripper. In other embodiments, other types of automated (or manual) remediation 206 may also (or alternatively) be employed. Additionally, in some embodiments, combinations of automated and manual remediation 206 may be utilized. For example, in some embodiments, there may be some components for which remediation would include notifying a field service engineer or user, some components for which remediation would include automated remediation, and some components where there would be automated remediation as well as notification of a user or field service engineer that some additional remediation tasks should be performed. Accordingly, the discussion of remediation 206 above, should be understood as being illustrative only, and should not be treated as limiting.

Of course, it should be understood that, in some embodiments, variations may be possible not only in how individual steps in a process such as shown in FIG. 2 are implemented but also in the steps of an alignment error detection and remediation process over all. For example, in some cases, rather than being triggered by detection of movement 201, retrieval of strain gauge measurements and various analytic steps with those measurements could simply be performed periodically (e.g., every morning on system startup), or in response to some other type of trigger (e.g., in response to initiation of an instrument-wide self-diagnostic routine). Accordingly, the discussion of the overall process of FIG. 2 should, like the discussion of that process' individual steps, be understood as being illustrative only, and should not be treated as limiting.

Figure 3:
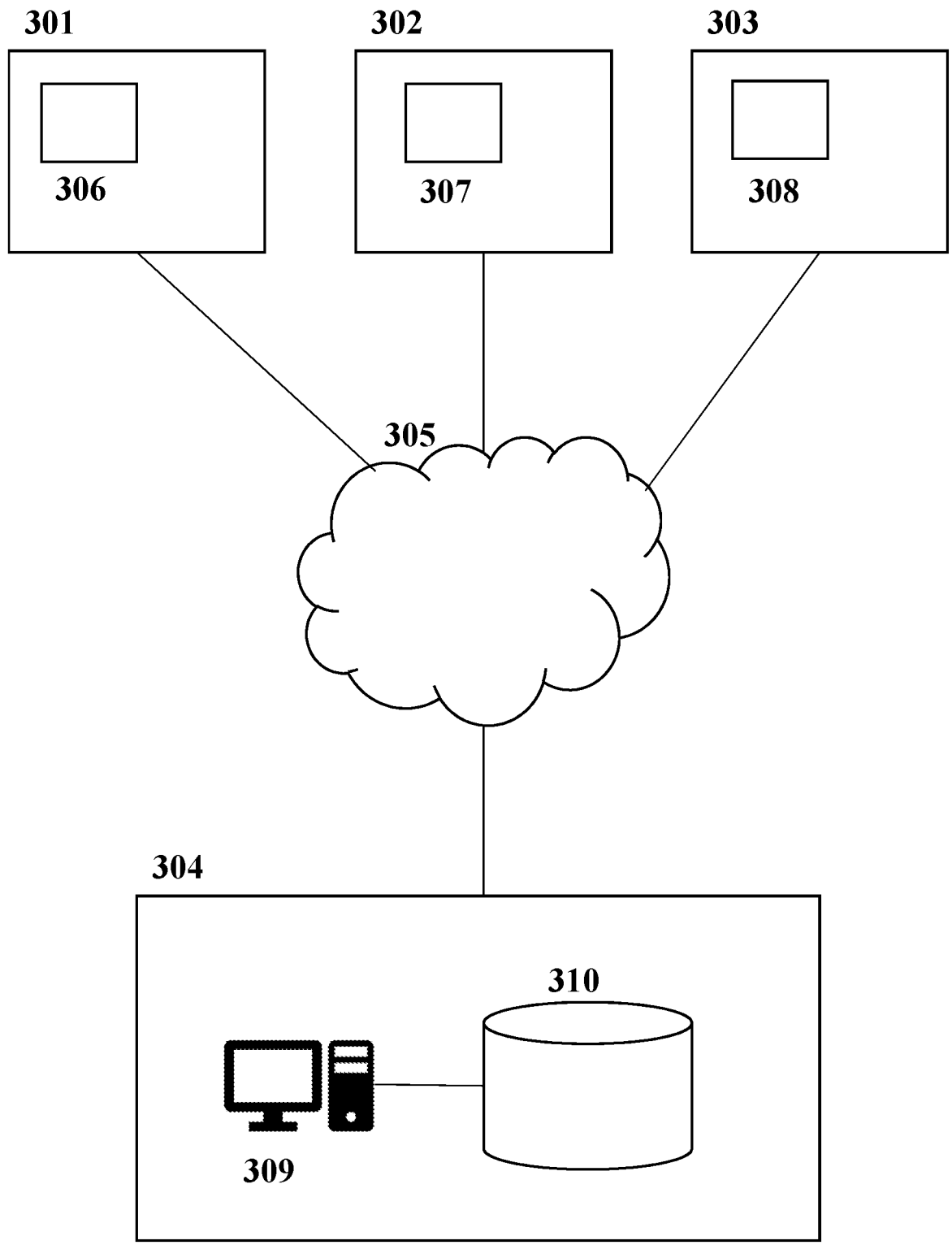
FIG. 3 illustrates an exemplary environment in which aspects of the disclosed technology may be deployed.

Turning now to FIG. 3, that figure illustrates an exemplary environment in which aspects of the disclosed technology may be deployed. In that environment, a plurality of laboratories 301 302 303 are connected to a remote maintenance system 304 via a network 305. Within each of the laboratories 301 302 303, there is disposed a diagnostic instrument 306 307 308 instrument with various sensors such as the accelerometer and strain gauges described previously. Within the remote maintenance system 304, there is an analysis server 309 and a database 310. In operation, the diagnostic instruments 306 307 308 would send information gathered by their sensors to the remote maintenance system 304 where it would be stored in the database 310 and processed using a processor from the analysis server 309, such as described previously in the context of the detection 203 of changes and determination 205 of impacted components from FIG. 2. The results of this analysis could then be communicated back to the relevant laboratory (e.g., to cause an alert to appear on a user interface of a computer at the laboratory), to a field service engineer, to both, or to neither (e.g., if there were no changes) as appropriate in a particular context. The information in the database could also be used subsequently, such as for analytics to further refine the models or analysis performed using the information retrieved from the sensor(s).

Of course, it should be understood that modifications on the environment of FIG. 3 may also be possible. For example, in some contexts, processing may be performed using computers at the relevant laboratories 301 302 303, rather than a remote maintenance server 309 as illustrated in the environment of FIG. 3. In these types of scenarios, the remote maintenance system 304 may be entirely eschewed, or it may be included, but only in a limited capacity. For instance, a remote maintenance system 304 may be included, but it would focus on performing analytics on sensor data stored in the database 310, rather than on determining impacted components 205 such as described above. Other types of modifications are also possible, and will be immediately apparent to those of ordinary skill in the art in light of this disclosure. Accordingly, the exemplary environment of FIG. 3, like the process of FIG. 2, should be understood as being illustrative only, and should not be treated as limiting.

In light of the potential variations on the disclosed embodiments that will be immediately apparent to, and could be implemented without undue experimentation by, those of ordinary skill in the art in light of this disclosure, the protection provided by this document or any related document should not be limited to the embodiments explicitly set forth herein. Instead, such protection should be understood as being defined by the claims in such document when the terms in those claims which are listed below under the heading "Explicit Definitions" are given the definitions set forth under that heading and the remaining terms are giving their broadest reasonable interpretation as set forth in a general purpose dictionary.

Explicit Definitions

When appearing in the claims, a statement that something is "based on" something else should be understood to mean that something is determined at least in part by the thing that it is indicated as being "based on." When something is required to be completely determined by a thing, it will be described as being "based exclusively on" the thing.

When used in the claims, "determining" should be understood to refer generating, selecting, defining, calculating or otherwise specifying something. For example, to obtain an output as the result of analysis would be an example of "determining" that output. As a second example, to choose a response from a list of possible responses would be a method of "determining" a response. As a third example, to identify data received from an external source (e.g., a microphone) as being a thing would be an example of "determining" the thing.

When used in the claims, a "lab instrument" or "instrument" should be understood to refer to any tool, machine, equipment, device, or combination of one or more thereof, whether fully or partially located within a laboratory (e.g., one portion of the lab instrument may be within a laboratory while another portion may be hosted in the cloud), or fully or partially located elsewhere, that may be used or may be configured to be used as recited in the claims.

When used in the claims a "means for detecting and remediating misalignment of devices on the diagnostic instrument" should be understood as a means plus function limitation as provided for in 35 U.S.C. § 112(f), in which the function is "detecting and remediating misalignment of devices on the diagnostic instrument" and the corresponding structure is a plurality of sensors coupled to the instrument and a computer configured to perform processes as illustrated in FIG. 2 and described in the corresponding text.

When used in the claims, a "set" should be understood as referring to a group of zero or more elements of similar nature, design or function.

The invention claimed is:

1. An intersecting device misalignment detection and remediation system for a diagnostic instrument, the system comprising:
   a) an accelerometer coupled to, and adapted to detect movement of, the diagnostic instrument;
   b) a plurality of strain gauges coupled to the diagnostic instrument;
   c) a device comprising a processor and a memory, the device comprising the processor and the memory configured to:
      i) for each of a set of structural elements of the diagnostic instrument, determine whether an alignment change has taken place in that structural element based on analyzing measurements made by the plurality of strain gauges based on detection of movement of the diagnostic instrument by the accelerometer; and
      ii) for each structural element where an alignment change is determined to have taken place, trigger a remediation for each device from a set of devices impacted by the alignment change of that structural element.

2. The system of claim 1, wherein:
   a) the diagnostic instrument comprises a baseplate; and
   b) the plurality of strain gauges comprises at least one set of strain gauges selected from the set of strain gauge sets consisting of:
      i) a set of four strain gauges connected to the baseplate; and
      ii) a set of two strain gauges, each of which is connected to the baseplate and to a gantry in an angled shape.

3. The system of claim 2, wherein:
   a) the baseplate has a rectangular shape;
   b) the plurality of strain gauges comprises the set of four strain gauges connected to the baseplate; and
   c) each strain gauge from the set of four strain gauges connected to the baseplate is attached to the baseplate at a predetermined stress point from a set of predetermined stress points on the baseplate.

4. The system of claim 3, wherein the set of predetermined stress points on the baseplate comprises:
   i) a point equidistant from a center of the baseplate and a first corner of the baseplate;
   ii) a point equidistant from the center of the baseplate and a second corner of the baseplate;
   iii) a point equidistant from the center of the baseplate and a third corner of the baseplate; and
   iv) a point equidistant from the center of the baseplate and a fourth corner of the baseplate.

5. The system of claim 1, wherein:
   a) the structural elements of the diagnostic instrument comprise a pick and place system; and
   b) the device comprising the processor and the memory is configured to, when an alignment change is determined to have taken place in the pick and place system, trigger remediation for a vessel holding assembly coupled to the pick and place system.

6. The system of claim 1, wherein:
   a) the structural elements of the diagnostic instrument comprise a pipetting system; and
   b) the device comprising the processor and the memory is configured to, when an alignment change is determined to have taken place in the pipetting system, trigger remediation for a probe coupled to the pipetting system.

7. A method for detecting and remediating misalignment of intersecting devices in a diagnostic instrument, the method comprising:
   a) detecting movement of the diagnostic instrument using an accelerometer coupled to the diagnostic instrument;
   b) using a device comprising a processor and a memory:
      i) based on detecting movement of the diagnostic instrument, determining, for each of a set of structure elements of the diagnostic instrument, whether an alignment change has taken place in that structural element based on analyzing measurements made by a plurality of strain gauges coupled to the diagnostic instrument;
      ii) for each structural element where an alignment change is determined to have taken place, trigger a remediation for each device from a set of devices impacted by the alignment change of that structural element.

8. The method of claim 7, wherein:
   a) the diagnostic instrument comprises a baseplate; and
   b) the plurality of strain gauges comprises at least one set of strain gauges selected from the set of strain gauge sets consisting of:
      i) a set of four strain gauges connected to the baseplate; and
      ii) a set of two strain gauges, each of which is connected to the baseplate and to a gantry in an angled shape.

9. The method of claim 8, wherein:
   a) the baseplate has a rectangular shape;
   b) the plurality of strain gauges comprises the set of four strain gauges connected to the baseplate;
   c) each strain gauge from the set of four strain gauges connected to the baseplate is attached to the baseplate at a predetermined stress point from a set of predetermined stress points on the baseplate.

10. The method of claim 9, wherein the set of predetermined stress points on the baseplate comprises:
    i) a point equidistant from a center of the baseplate and a first corner of the baseplate;
    ii) a point equidistant from the center of the baseplate and a second corner of the baseplate;
    iii) a point equidistant from the center of the baseplate and a third corner of the baseplate; and
    iv) a point equidistant from the center of the baseplate and a fourth corner of the baseplate.

11. The method of claim 7, wherein:
    a) the structural elements of the diagnostic instrument comprise a pick and place system; and
    b) the device comprising the processor and the memory is configured to, when an alignment change is determined to have taken place in the pick and place system, trigger remediation for a vessel holding assembly coupled to the pick and place system.

12. The method of claim 7, wherein:
    a) the structural elements of the diagnostic instrument comprise a pipetting system; and
    b) the device comprising the processor and the memory is configured to, when an alignment change is determined to have taken place in the pipetting system, trigger remediation for a probe coupled to the pipetting system.

* * * * *